United States Patent
Glugla et al.

(10) Patent No.: US 9,393,947 B2
(45) Date of Patent: Jul. 19, 2016

(54) TORSIONAL DAMPING USING A TORQUE CONVERTOR BYPASS CLUTCH

(71) Applicant: FORD GLOBAL TECHNOLOGIES, LLC, Dearborn, MI (US)

(72) Inventors: Chris P. Glugla, Macomb, MI (US); Robert S. Baskins, Grass Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 646 days.

(21) Appl. No.: 13/788,158

(22) Filed: Mar. 7, 2013

(65) Prior Publication Data

US 2014/0256510 A1   Sep. 11, 2014

(51) Int. Cl.
 B60W 10/02 (2006.01)
 B60W 10/06 (2006.01)
 B60W 30/20 (2006.01)

(52) U.S. Cl.
 CPC ............... B60W 10/02 (2013.01); B60W 10/06 (2013.01); B60W 30/20 (2013.01); *B60W 2030/206* (2013.01); *Y10T 477/79* (2015.01)

(58) Field of Classification Search
 CPC ... B60W 10/026; Y10T 477/78; Y10T 477/79
 USPC ........................................................ 477/181
 See application file for complete search history.

(56) References Cited

U.S. PATENT DOCUMENTS

| 3,924,457 | A | * | 12/1975 | Oshima | ................. | G01M 15/11 |
| | | | | | | 60/277 |
| 4,143,561 | A | | 3/1979 | Melhorn | | |
| 5,308,282 | A | | 5/1994 | Hansen et al. | | |
| 5,413,539 | A | | 5/1995 | Leonard et al. | | |
| 6,782,984 | B2 | | 8/2004 | Tsunekawa et al. | | |
| 6,843,752 | B2 | | 1/2005 | Bolander | | |
| 7,028,670 | B2 | | 4/2006 | Doering | | |
| 7,086,386 | B2 | | 8/2006 | Doering | | |
| 7,585,241 | B2 | | 9/2009 | Tamba et al. | | |
| 7,854,683 | B2 | | 12/2010 | DeGeorge et al. | | |
| 7,950,273 | B2 | | 5/2011 | Assaf et al. | | |
| 8,010,265 | B2 | | 8/2011 | Samie et al. | | |
| 8,052,575 | B2 | * | 11/2011 | Albertson | ............. | F16H 61/143 |
| | | | | | | 477/98 |
| 2005/0193721 | A1 | * | 9/2005 | Surnilla | .............. | F02D 41/0087 |
| | | | | | | 60/285 |
| 2010/0063711 | A1 | * | 3/2010 | Hagel | ................. | F02D 41/0087 |
| | | | | | | 701/111 |
| 2011/0202260 | A1 | * | 8/2011 | Cunningham | .......... | F02D 35/02 |
| | | | | | | 701/104 |
| 2012/0035819 | A1 | | 2/2012 | Hebbale et al. | | |
| 2012/0234123 | A1 | | 9/2012 | Whitney et al. | | |
| 2012/0259522 | A1 | * | 10/2012 | Kanazawa | ............. | F02D 29/00 |
| | | | | | | 701/68 |
| 2014/0257674 | A1 | * | 9/2014 | Assaf | .................. | F02D 41/0027 |
| | | | | | | 701/104 |
| 2014/0352659 | A1 | * | 12/2014 | Glugla | ................ | F02D 41/0087 |
| | | | | | | 123/350 |

* cited by examiner

*Primary Examiner* — Justin Holmes
*Assistant Examiner* — Stacey Fluhart
(74) *Attorney, Agent, or Firm* — James Dottavio; MacMillan, Sobanski & Todd, LLC

(57) ABSTRACT

A method for controlling a clutch driveably connected to an engine and vehicle wheels includes stopping fuel supply to an engine cylinder, provided a misfire occurs in the cylinder, producing slip across the clutch, resuming fuel supply to the engine cylinder, provided engine speed and engine load remain below reference limits, and adjusting a state of the clutch without reference to engine misfiring.

19 Claims, 2 Drawing Sheets

TORSIONAL DAMPING USING A TORQUE CONVERTOR BYPASS CLUTCH

BACKGROUND OF THE INVENTION

1. Field of the Invention

This invention relates generally to a method for controlling slip of a toque convertor bypass clutch such that the clutch dampens powertrain vibrations caused by engine misfiring.

2. Description of the Prior Art

Spark ignition gasoline engines sometimes have engine misfires. Government regulations allow the fuel supply to the misfiring cylinders to be shut off to prevent high emissions output and potential thermal damage to the catalyst emissions system. Government regulations also require that a malfunction light be illuminated when engine misfiring occurs.

Depending on the number of engine cylinders that are misfiring and the number of cylinders shut off during failure mode management (FMM), the engine and vehicle can shake from the uneven torque pulses by only operating a portion of the total cylinders.

Operating with excessive shake or under poor noise, vibration and harshness (NVH) conditions is to be avoided.

SUMMARY OF THE INVENTION

A method for controlling a clutch driveably connected to an engine and vehicle wheels includes stopping fuel supply to an engine cylinder, provided a misfire occurs in the cylinder, producing slip across the clutch, resuming fuel supply to the engine cylinder, provided engine speed and engine load remain below reference limits, and adjusting a state of the clutch without reference to engine misfiring.

The method allows NVH damping, whereas leaving the torque convertor bypass clutch fully engaged or locked mode transmits undesirable vibration to the driveline.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
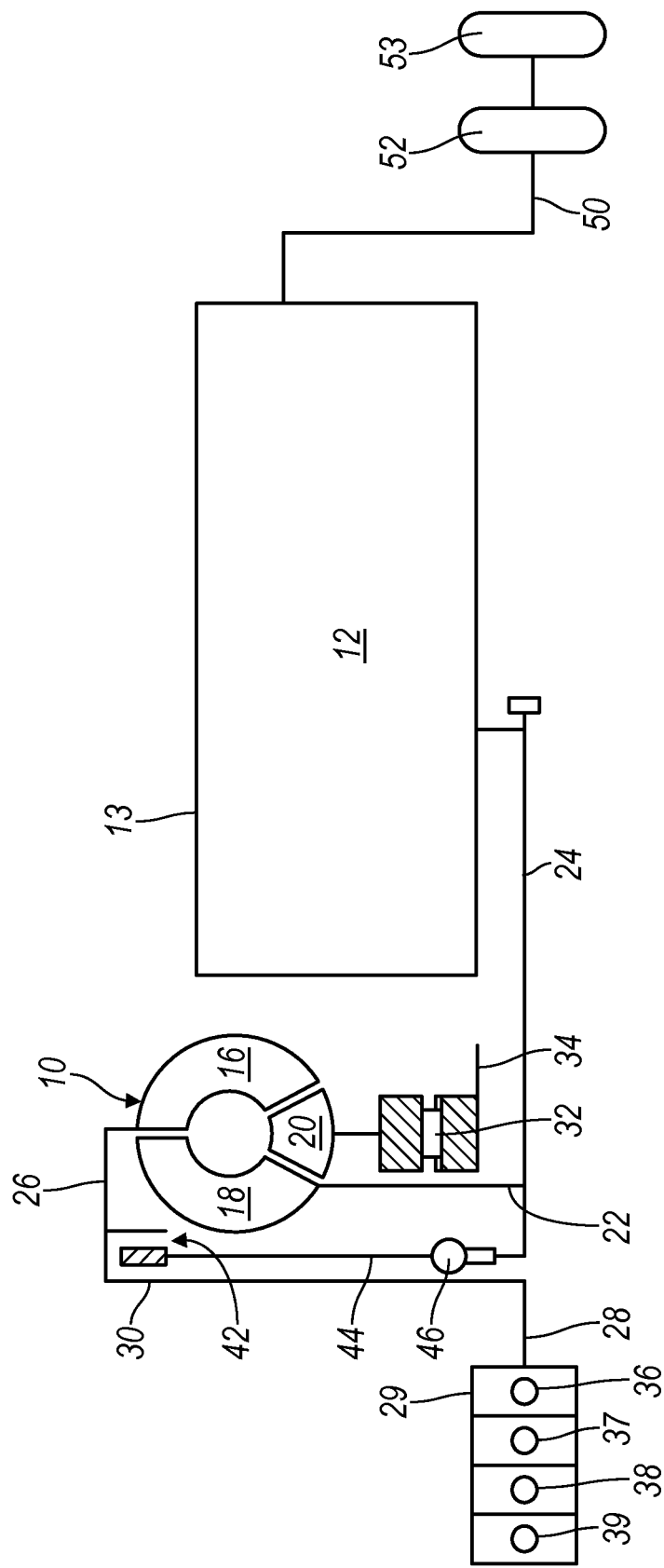
FIG. 1 is a schematic diagram showing a torque converter located in a vehicle powertrain.
Figure 2:
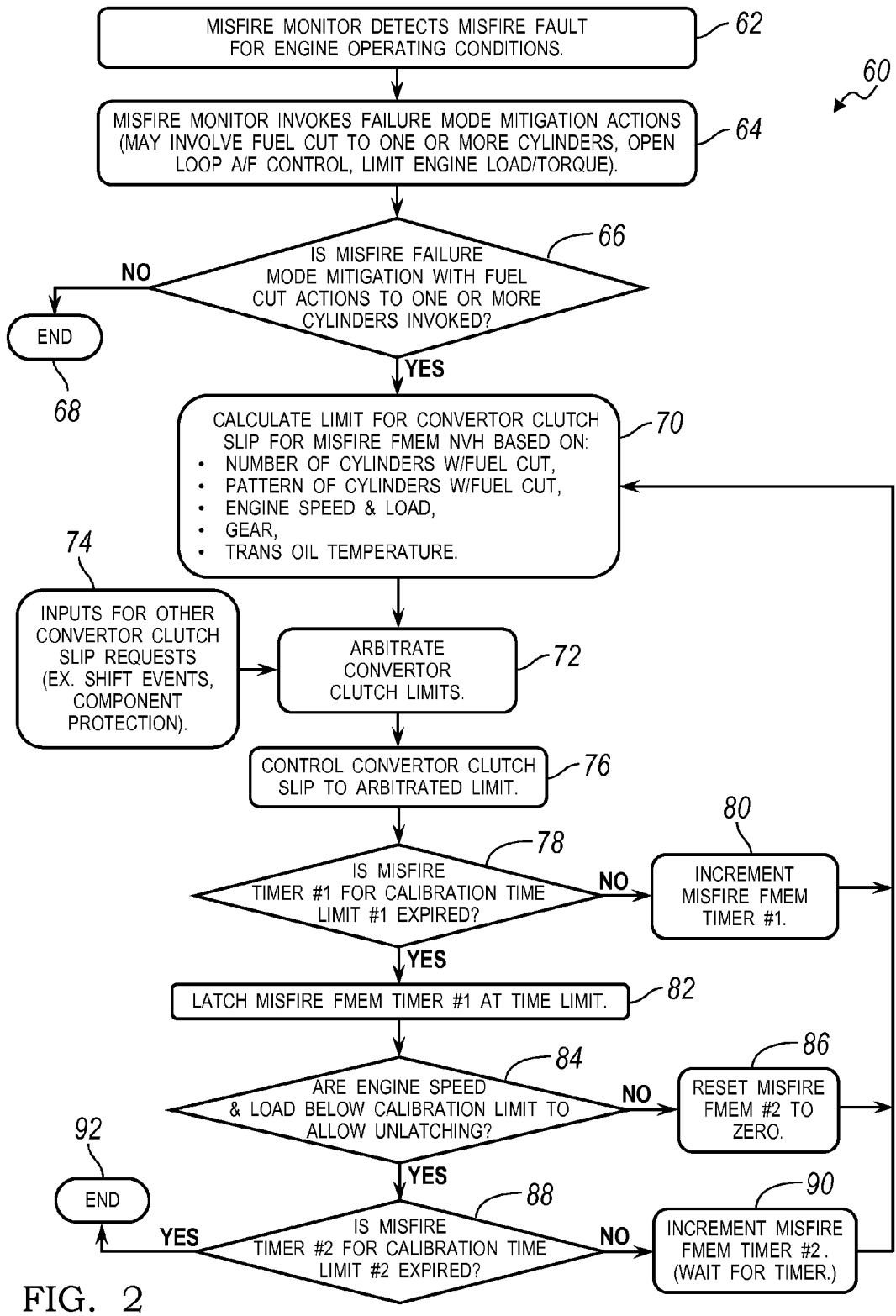
FIG. 2 is logic flow diagram of a control algorithm.

In the cross-sectional view seen in FIG. 2, numeral 10 designates a hydrokinetic torque converter and numeral 12 designates a compound planetary gear unit. The torque converter 10 and gear unit 12 are located in a transmission housing 13.

The torque converter 10 includes a bladed impeller 16, a bladed turbine 18, and a bladed stator 20. Stator 20 is mounted on a one-way brake 32 and is supported by stationary turbine sleeve shaft 34.

The converter elements 16, 18 and 20 form a toroidal fluid flow path in known fashion, whereby impeller torque is multiplied hydrokinetically to produce a turbine torque that is distributed through turbine hub 22 to the turbine shaft 24. The impeller 16 is enclosed within an impeller housing 26, which is bolted to the crankshaft 28 an internal combustion engine 29. The bolts are located at the hub of a drive plate 30, the latter being secured to the outer periphery of the impeller housing 26. Engine 29 includes multiple cylinders 36, 37, 38, 39.

A torque converter bypass clutch 42 includes a clutch plate 44 adapted to engage the adjacent wall of the impeller housing 26. Plate 44 is secured to turbine hub 22 by means of a damper assembly 46. Fluid is distributed radially outward through the space between the clutch plate 44 and the adjacent wall of the impeller housing when the clutch is disengaged. The torque converter 10 at that time acts as an open converter and is capable of multiplying torque hydrokinetically. Fluid is supplied continuously to the toroidal cavity of the converter and the pressure thus developed applies the clutch by engaging the clutch plate 44 against the adjacent frictions surface of the impeller housing. The radial outward flow through the space between the plate 44 and the adjacent wall of the impeller housing is interrupted when the clutch is applied.

The transmission output 50 is driveably connected to the driven wheels 52, 53 of the vehicle.

During FMM, opening the torque convertor clutch 42 or controlling slip across the torque convertor clutch 42 partially decouples (creates a viscous damper) between the engine 29 and the wheels 52. Either opening clutch 42 or controlling its slip ratio as a function of the number of firing cylinders of engine 29 allows damping of torsional vibration from the engine 29 through the driveline and stops the vehicle shaking and poor vehicle NVH.

The logic flow diagram 60 of FIG. 2 represents an algorithm for controlling bypass clutch 42. At step 62, on-board diagnostics detects a high rate of engine misfiring, greater than a limit rate that would damage a catalytic converter on-board the vehicle. Various techniques for determining engine misfiring includes crankshaft-based acceleration that measures acceleration input to the crankshaft from each cylinder torque pulse This can't happen if convertor is locked, spark plug ionization, and use of an in-cylinder pressure transducer whose pressure signal can be used to detect misfiring.

At step 64, an engine misfire monitor invokes failure mode mitigation such as fuel cut-off to any of the misfiring cylinders of engine 29, open-loop air fuel control and limiting engine load and torque output by the engine.

At step 66, a test is made to determine whether fuel cut-off to at least one of the engine cylinders has occurred. If the result of test 66 is logically false, at step 68 execution of the algorithm ends.

If the result of test 66 is true, at step 70 a desired slip across bypass clutch 42 is determined as a function of such variable that may include the number of cylinders to which fuel is shut-off, the relation between cylinder firing sequence and the shut-off cylinders, engine speed, engine load, the current gear in which transmission gear unit 12 is operating, temperature of automatic transmission fluid (ATF) in gear unit 12, etc. For example, the desired slip across clutch 42 would be greater if the misfiring cylinders were consecutive in the firing order rather than if such cylinders were separated mutually in the firing order.

At step 72 a controller that controls the engaged, disengaged and slipping state of clutch 42 arbitrates the relative importance of the desired slip produced at step 70 with other converter clutch slip requests 74 in support of gear shift events, transmission component production, etc.

At step 76, the controller of clutch 42 produces a signal representing the arbitrated clutch slip limit. In response to that signal, a solenoid actuates a valve, which produces hydraulic pressure in the torque converter corresponding to the magnitude of the clutch slip limit.

At step 78, a test is made to determine whether a first timer, which counts up during a first period, has expired, the first period preferably having a length of 30 seconds immediately following the beginning of engine misfiring. If the result of test 78 is logically false, at step 80 that timer is incremented to the length of the first period, and control returns to step 70 awaiting expiration of the first timer.

When the result of test 78 is true, at step 82 the first timer is latched at the time limit of the first timer.

At step 84, a test is made to determine whether engine speed and engine load have decreased to acceptable magnitudes that would allow unlatching the failure mode mitigation actions. If the result of test 84 is false, at step 86 a second timer is reset to zero awaiting a tip-out event, and control returns to step 70.

If the result of test 84 is true, at step 88 a test is made to determine whether the second timer has expired. Preferably the second timer is set to a few seconds only. If the result of test 88 is false, at step 90 a second timer is incremented awaiting the second timer to expire, and control returns to step 70.

If the result of test 88 is true, indicating that engine speed and load have reduced to lower magnitudes and remained low for at least the length of the reference period of the second timer, at step 92 fuel supply to the cut-off engine cylinders is restored, the state of bypass clutch 42 is reestablished and produced without reference to engine misfiring, and execution of the algorithm ends.

Steps 84, 86, 88 and 90 comprise a period during which the clutch controller awaits engine operating conditions to return to acceptable levels before resupplying fuel to the misfiring cylinders of engine 29.

In accordance with the provisions of the patent statutes, the preferred embodiment has been described. However, it should be noted that the alternate embodiments can be practiced otherwise than as specifically illustrated and described.

The invention claimed is:

1. A method for controlling a clutch driveably connected to an engine and vehicle wheels, comprising:
    (a) stopping fuel supply to an engine cylinder, provided a misfire occurs in the cylinder;
    (b) producing slip across said clutch, with a magnitude of the slip produced across said clutch referenced to a number of misfiring cylinders to which fuel supply has been stopped;
    (c) resuming fuel supply to the engine cylinder, provided engine speed and engine load remains below reference limits;
    (d) adjusting a state of said clutch without reference to engine misfiring.

2. A method of claim 1 wherein step (a) includes maintaining fuel supply stopped to the engine cylinder for a length of a first period.

3. A method of claim 1, comprising using diagnostics on-board the vehicle to detect a rate of engine misfiring greater than a reference misfire rate, before executing step (a).

4. A method of claim 3, wherein the rate of engine misfiring is detected with reference to engine crankshaft-based acceleration.

5. A method of claim 3, wherein the rate of engine misfiring is detected using spark plug ionization.

6. A method of claim 3, wherein the rate of engine misfiring is detected using a pressure transducer producing a signal representing pressure within the cylinder.

7. A method of claim 1 wherein step (b) includes determining a magnitude of the slip produced across said clutch with reference to slip requests related to operation of a torque converter bypass clutch of the vehicle.

8. A method of claim 1 wherein step (b) includes determining a magnitude of the slip produced across said clutch with reference to a firing pattern of multiple cylinders to which fuel supply has been stopped.

9. A method of claim 1 wherein step (b) includes determining a magnitude of the slip produced across said clutch with reference to a gear in which a transmission of the vehicle is operating, and a temperature of fluid in the transmission.

10. A method of claim 1 wherein step (c) includes determining that engine speed and load have remained below the reference limits for a length of a first period.

11. A method for controlling a bypass clutch of a torque converter driveably connected to an engine through a transmission to vehicle wheels, comprising:
    (a) stopping fuel supply to engine cylinders in which a misfire occurs;
    (b) producing slip across the clutch, with a magnitude of the slip produced across said clutch referenced to a firing pattern of multiple cylinders to which fuel supply has been stopped;
    (c) resuming fuel supply to said engine cylinders provided engine speed and engine load remains below reference limits;
    (d) adjusting a state of the clutch without reference to engine misfiring.

12. A method of claim 11 wherein step (a) includes maintaining fuel supply to said cylinders stopped for a length of a first period.

13. A method of claim 11, comprising using diagnostics on-board the vehicle to detect a rate of engine misfiring greater than a reference misfire rate before executing step (a).

14. A method of claim 13, wherein the rate of engine misfiring is detected by one of reference to engine crankshaft-based acceleration, using spark plug ionization, or using a pressure transducer producing a signal representing pressure within the cylinder.

15. A method of claim 11 wherein step (b) includes determining a magnitude of the slip produced across said clutch with reference to slip requests related to operation of the bypass clutch.

16. A method of claim 11 wherein step (b) further includes determining a magnitude of the slip produced across said clutch with reference to a number of misfiring cylinders to which fuel supply has been stopped.

17. A method of claim 11 wherein step (b) includes determining a magnitude of the slip produced across said clutch with reference to a gear in which a transmission of the vehicle is operating, and a temperature of fluid in the transmission.

18. A method of claim 11 wherein step (c) includes determining that engine speed and load have remained below the reference limits for a length of a first period.

19. A method for controlling a clutch driveably connected to an engine and vehicle wheels, comprising:
    stopping fuel supply to an engine cylinder and producing slip across said clutch, provided a rate of misfire greater than a reference misfire rate occurs in the cylinder;

resuming fuel supply to the engine cylinder, provided engine speed and engine load remains below reference limits;

adjusting a state of said clutch without reference to engine misfiring.

* * * * *